No. 631,920. Patented Aug. 29, 1899.
W. N. AUSTIN.
PIPE VENT.
(Application filed Mar. 12, 1898.)
(No Model.)
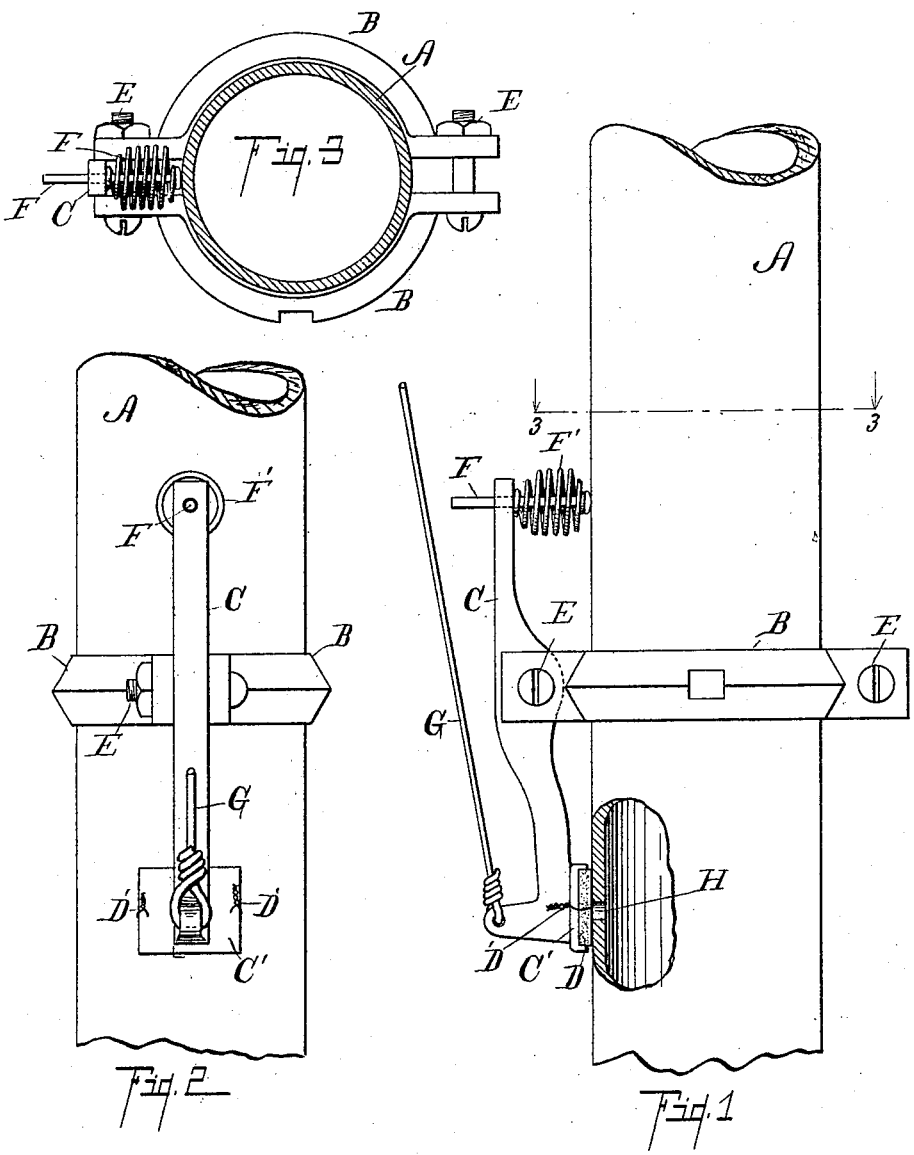
Witnesses:
W. S. Wood
Otto A. Carl
Inventor,
William N. Austin
By Fred L. Chappell
Att'y.

UNITED STATES PATENT OFFICE.

WILLIAM N. AUSTIN, OF TEXAS, MICHIGAN, ASSIGNOR OF ONE-HALF TO WILLIAM W. HARRISON, OF SAME PLACE.

PIPE-VENT.

SPECIFICATION forming part of Letters Patent No. 631,920, dated August 29, 1899.

Application filed March 12, 1898. Serial No. 673,672. (No model.)

*To all whom it may concern:*

Be it known that I, WILLIAM N. AUSTIN, a citizen of the United States, residing at Texas, in the county of Kalamazoo and State of Michigan, have invented a certain new and useful Pipe-Vent, of which the following is a specification.

This invention relates to improvements in vent-controlling devices for well-pipes.

The objects of this invention are, first, to provide a perfectly efficient construction that can be easily attached to any pump in use to control the vent-perforations already therein, and, second, to provide a simple and cheap construction for the purpose.

Further objects will appear definitely in the detailed description.

I accomplish these objects of my invention by the devices and means described in this specification.

The invention is pointed out in the claims.

The structure is fully illustrated in the accompanying drawings, forming a part of this specification, in which—

Figure 1 is a detail view of a section of pump-pipe with one of my improved vent-controlling devices in position, the pipe being partially in section to show the operation of the same. Fig. 2 is a front elevation of the same. Fig. 3 is a view taken on line 3 of Fig. 1, looking down.

In the drawings similar letters of reference refer to similar parts throughout the several views.

Referring to the lettered parts of the drawings, I provide a divided collar consisting of sections B B, which are clamped upon the pipe A by bolts E E' through the ends thereof. On one of the bolts E', which serves to clamp the collar together, I place the lever C and adjust the bolt of the opposite side to permit the same to freely pivot or fulcrum on the bolt E'. Through a suitable perforation on the end of the lever C, I insert a nail or pin F, having a head, so that the head shall rest against the pipe. On this I place a spiral or coil spring F', so that it comes between the head of the pin and the end of the lever C, and the tension of the spring forces the end of the lever out. The opposite end of the lever C is expanded into a plate, on which is secured a suitable packing D by means of wires D'. This is adapted to cover the vent-holes H in the pipe. A wire, cord, or chain G is secured to an eye in the bottom end of the lever, so that the lever can be pulled back and open the vent H so that the pipe can be drained. The cord or wire G can be secured to any suitable part of the pump or windmill, where such is used, or can be fastened above in any well-known way.

It will be observed that the structure I have produced is exceedingly simple and effective to the end intended and is adapted to place on a pump-pipe to control the vent thereon very conveniently and expeditiously and at a very slight cost.

Having thus described my invention, what I claim as new, and desire to secure by Letters Patent, is—

1. The combination of a divided collar B, B, secured together by suitable bolts E, E', to retain it on a pipe; the lever C, pivoted on bolt E'; a pin F, fitting loosely in a hole in the end of the lever, one end of which is adapted to press against the pipe; and the coiled spring F', on a pin F; a packing on the opposite end of the lever positioned to close the vent and a cord or chain connected to the lever to open the vent for the purpose specified.

2. The combination of a collar; a lever pivoted to said collar; a pin fitting closely in a hole and through said lever the opposite ends resting against the pipe; a coiled spring on the pin; and a packing on the opposite end of the lever for the purpose specified.

In witness whereof I have hereunto set my hand and seal in the presence of two witnesses.

WILLIAM N. AUSTIN. [L. S.]

Witnesses:
OTIS A. EARL,
VENE E. CHAPPELL.